June 20, 1933.    M. A. WHITING    1,915,042
CONTROL SYSTEM
Filed Sept. 26, 1929    2 Sheets-Sheet 1
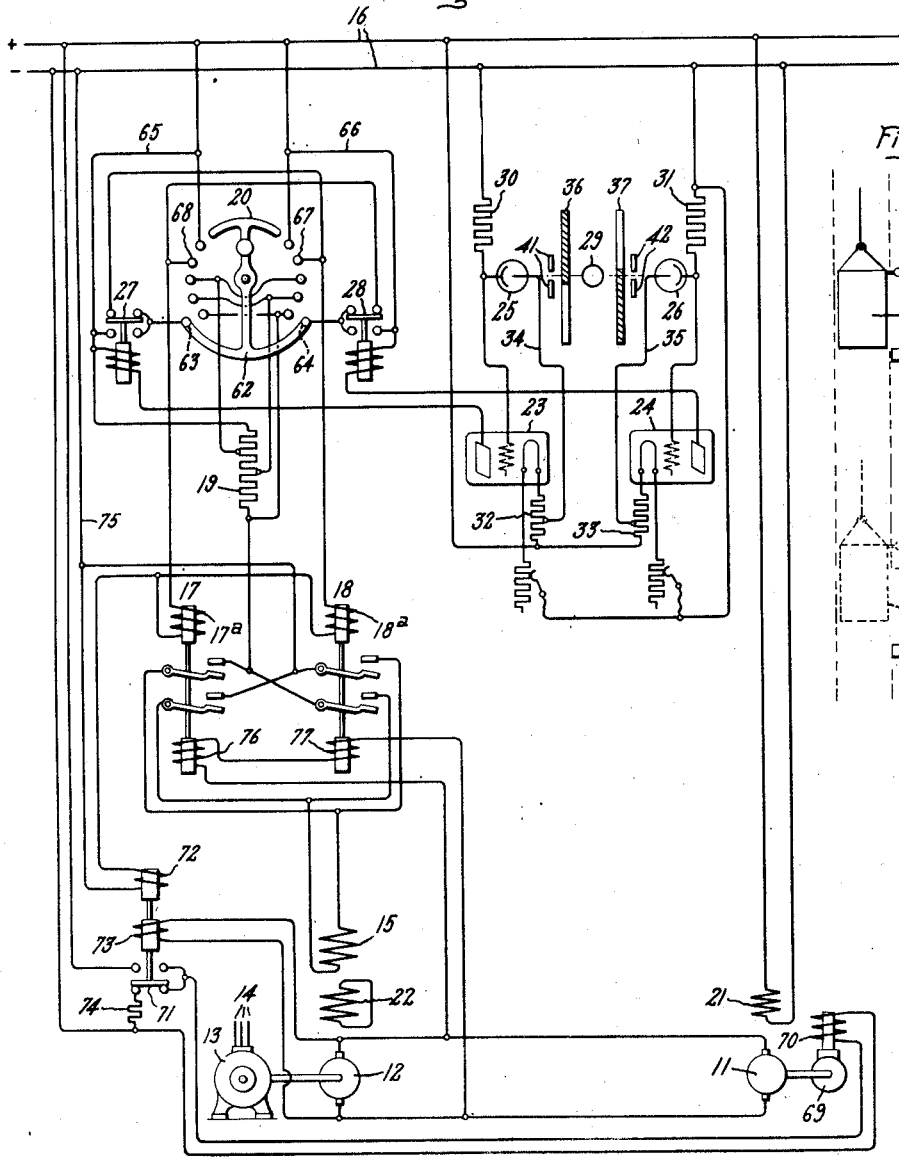
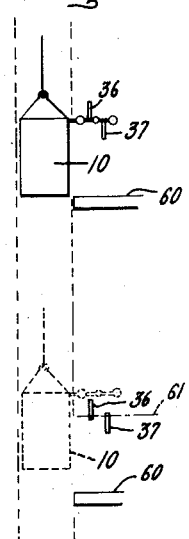
Inventor:
Max A. Whiting.
by Charles E. Tullar
His Attorney.

Inventor:
Max A. Whiting.
by Charles E. Tullar
His Attorney.

Patented June 20, 1933

1,915,042

UNITED STATES PATENT OFFICE

MAX A. WHITING, OF SCHENECTADY, NEW YORK, ASSIGNOR TO GENERAL ELECTRIC COMPANY, A CORPORATION OF NEW YORK

CONTROL SYSTEM

Application filed September 26, 1929. Serial No. 395,379.

This invention relates to control systems and has for an object the provision of a simple and reliable control system which is responsive to the relative position of a control device and another control element.

My invention has general application to electrical control systems for various purposes and it is especially applicable to installations such as elevators, railway turntables, weighing devices, float controlled devices and the like wherein a movable member or element is provided and wherein it is desired to effect the control operation in accordance with the movements or position of this element. Thus the control operation may be initiated, terminated or modified in some particular manner upon the arrival of the movable element at a predetermined position with respect to another element which may be either movable or stationary. For example, as applied to the control of an elevator my invention may be utilized to effect the control of the elevator itself when the elevator arrives in a predetermined position in the hatchway so as to bring the elevator to rest level with the desired landing. In short, the invention has general application to control systems which are responsive to the position of one object or element with respect to another object or element, stationary or moving.

In carrying out my invention in one form thereof, I provide a suitable device for controlling the movement of a movable object together with means including a light sensitive device such as a photo-electric cell, controlled in accordance with its relative position with respect to a control element, for effecting an operation of the control device.

A further object of the invention is the provision of a control system for a moving body in which a light sensitive device is employed to control the movement of the moving body, together with suitable means for introducing a velocity compensation in the control operation.

In providing velocity compensation, control means including a light sensitive device and a relatively movable control element are employed for normally controlling the movement of the moving body, together with means for effecting an additional relative movement between the light sensitive device and the control element which additional movement is proportional to the speed of the moving body and which effects a modification of the normal operation of the control means.

Figure 3:
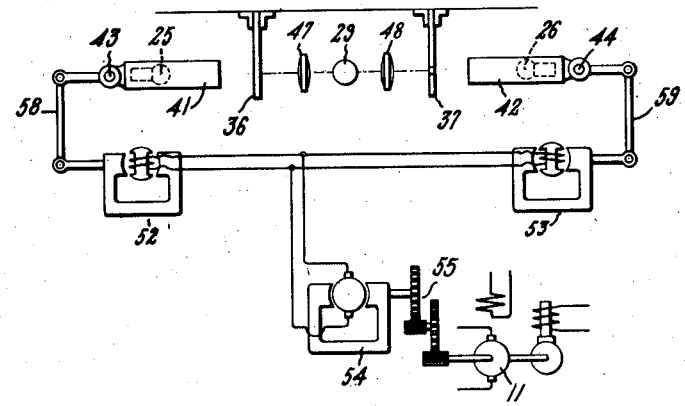
Figure 4:
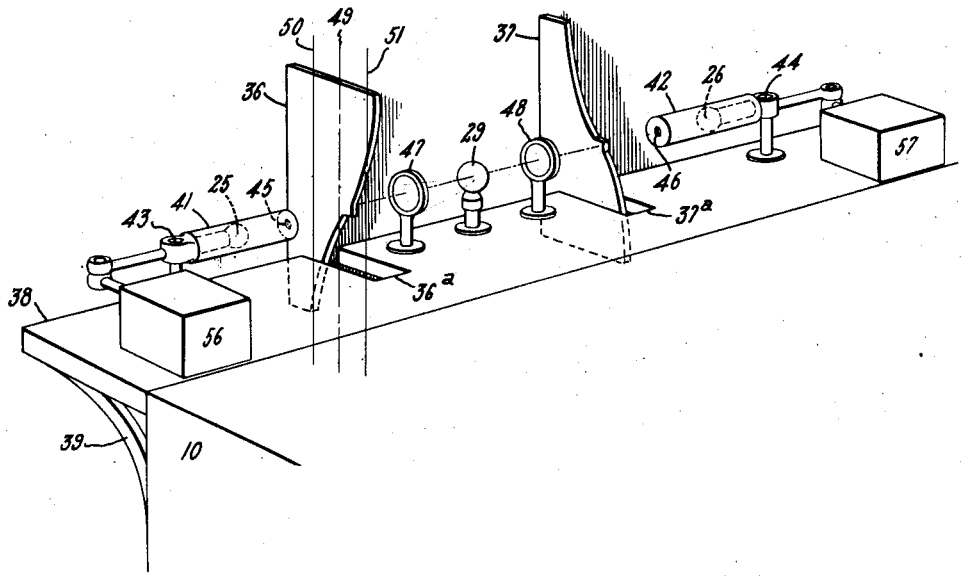

For a better and more complete understanding of this invention reference should be had to the accompanying drawings in which Fig. 1 is a diagrammatic illustration of a system of elevator control embodying the invention, Fig. 2 is a diagrammatic view showing details of operation, Fig. 3 is a diagrammatic view of details of the control apparatus employed in an elevator control system embodying the invention and Fig. 4 is a view in perspective of the apparatus details shown in Fig. 3.

Referring now to the drawings, an elevator car 10 is arranged to be raised and lowered by means of a motor 11 which has a suitable driving connection with the winding drum of the elevator. This motor is electrically connected in a Ward-Leonard system to a generator 12 which is driven by a suitable driving motor 13 which may be of any suitable type, but which has been shown as a three-phase alternating current motor supplied from any suitable three-phase source of electric power represented in the drawings by the supply lines 14. The voltage of the generator is varied to control the speed of the motor 11 by varying the excitation of the generator field winding 15. The field winding 15 is energized from a suitable direct current source of supply 16, suitable electro-magnetic reversing switches or contactors 17 and 18 respectively being included in the connections and also a variable resistance 19; the reversing switches and the resistance being controlled by a muliposition, manually-operated, speed-governing controller or master switch 20.

With the controller 20 in the central or "off" position shown in the drawings, the generator field winding 15 is deenergized and consequently the motor 11 is at rest. Movement of the master switch 20 toward the left, that is in a counterclockwise direction to short circuit the first two upper contacts energizes the coil 17a, the result of which is to close the reversing contactor 17 whereby the field winding 15 is connected to the source 16 with all of the resistance 19 in the circuit. Assuming that the generator 12 is being driven by the motor 13, a low generator voltage will be produced whereby the driving motor 11 is started at low speed to move the elevator in a downward direction. Continued movement of the controller 20 in the counterclockwise direction successively short circuits the sections of the field resistor 19 so as to increase the field excitation of the generator and thereby increase the speed of the driving motor 11.

Movement of the master switch 20 in the opposite direction, i. e., from the central or off position in a clockwise direction energizes the coil 18a which results in closing the reversing contactor 18 whereby the field 15 is energized in the reverse direction, the result of which is to effect rotation of the motor 11 in the reverse direction. Continued movement of the switch 20 in the clockwise direction gradually short circuits the successive sections of the field resistor 19 to increase the speed of the motor 11 as explained above. The field winding 21 of the driving motor is also connected to the source of supply 16 as shown.

The supply generator 12 is provided with an additional field winding 22 which as shown is short circuited to provide suitable damping, i. e., the energization of the generator field is inductively prolonged after the controller 20 has been thrown from an operative position to the central or off position for the purpose of preventing a too sudden regenerative breaking effect upon the traction motor 11 with the attendant rapid deceleration and discomfort to the passengers.

In the system thus far described, it will be observed that the starting and stopping of the elevator is effected manually by the operator and consequently the accuracy of the stops is entirely dependent upon his judgment in initiating the controlling operation of the elevator. In accordance with this invention, however, means are provided for automatically controlling the operation of the elevator within a predetermined zone which extends a short distance above and below the desired landing so that the car may be accurately stopped level with the floor. This automatic leveling control comprises two three-element electric discharge devices 23 and 24 and two photo-electric cells 25 and 26; the photo-electric cells 25 and 26 being electrically associated with the electric discharge devices 23 and 24 respectively. The electric discharge device 23 and the photo-electric cell 25 cooperate to control the downward leveling operation of the elevator, whilst the electric discharge device 24 and the photo-electric cell 26 cooperate to control the upward leveling operation of the elevator. These devices are mounted in a suitable position on the elevator itself as is most clearly shown in Fig. 4 of the drawings. The electric discharge devices 23 and 24 have their grid circuits and their plate circuits energized from the supply source 16 and they are respectively arranged to control electro-magnetic relays 27 and 28, the operating coils of which are included respectively in their plate circuits and which in turn control the reversing switches 17 and 18 under certain conditions after the controller 20 has been thrown to a central or off position to decelerate the elevator.

The electric discharge devices 23 and 24 do not of themselves initiate any operation but control the relays 27 and 28 responsively to grid biases imposed upon them respectively by the photo-electric cells 25 and 26. The electric discharge devices are connected and arranged normally to pass current, this condition of conductance being maintained by the cooperating photo-electric cells 25 and 26 together with any suitable source of light such for example as the lamp 29. The electric discharge devices 23 and 24 are biased to cut off by means of resistors 30 and 31 respectively of suitable dimensions connected from the grids of the devices 23 and 24 respectively to the negative supply line 16. As shown the cathode of the photo-electric cell 25 is connected to the common point between the resistor 30 and the grid of the electric discharge device 23, whilst the cathode of the photo-electric cell 26 is likewise connected to the common point between the resistor 31 and the grid of the electric discharge device 24. Resistors 32 and 33 are respectively connected in the positive supply leads to the filaments of the electric discharge devices 23 and 24. A positive bias of suitable magnitude is applied to the anodes of the photo-electric cells 25 and 26 by connections 34 and 35 respectively from the anodes of these cells to suitable intermediate points of the biasing resistors 32 and 33 respectively.

Normally both photo-electric cells 25 and 26 receive light from the light source 29 and are thus rendered electrically conducting as will be understood by persons skilled in this art and thus caused to conduct current from one side of the supply source 16 to the other. Passage of current through the photo-electric cells, however, will cause the cathode ends of the resistors 30 and 31 to become slightly positive with respect to the negative supply line 16 and as a result the negative bias which would otherwise be imposed upon the grids of the electric discharge devices 23 and 24 is decreased sufficiently to render these devices conductive, that is, to cause a current to flow in their plate circuits with the result that the windings of the relays 27 and 28 are energized and the relays normally maintained in a position bridging their upper contacts as shown in the drawings.

In order that the photo-electric cells 25 and 26 may be caused to initiate a controlling operation to bring the elevator car to rest level with the desired landing a pair of opaque screens 36 and 37 are placed adjacent each floor in the hatchway and in such position that the screen 36 will intercept the light rays from the source 29 to the photo-electric cell 25 and the screen 37 will intercept the light from the source 29 to the photo-electric cell 26 when the floor of the car passes the floor of the landing.

In Fig. 4 a physical embodiment of the control apparatus just described is shown as installed on an elevator car. As shown this control apparatus is suitably mounted upon a shelf 38 which is preferably supported at or near the top of the car 10 by a suitable supporting means such as bracket 39. The source of light 29 is disposed in a suitable central position intermediate the extremities of the shelf whilst the photo-electric cells 25 and 26 are mounted at the extremities of the shelf as shown. Photo-electric cells 25 and 26 are respectively mounted in suitable cylindrical holders 41 and 42 which are pivoted to rotate about the vertical axes of their supporting shafts 43 and 44 respectively. Light is admitted to the enclosures of these cylindrical holders through apertures 45 and 46 located at the extremities thereof near the light source 29 as shown. In order that a parallel beam of light may be directed from the light source 29 to the photo-electric cells, lenses 47 and 48 are provided in the paths from the light source 29 to the photo-electric cells 25 and 26 respectively.

The screens 36 and 37 are mounted stationary in the hatchway, one pair of such screens per floor. These screens are completely opaque and are so arranged as to intercept the beam of light completely under some conditions and to allow it to pass undiminished under other conditions. It will be understood that the shelf 38 will be provided with slots 36a and 37a respectively to permit the screens 36 and 37 to project across light paths from the source of light to the photo-electric cells 25 and 26. For zero velocity of the car the locus of the narrow beam which passes through the aperture 45 to the photo-electric cell 25 is represented by the vertical center line 49 in Fig. 4. The limits of the transverse width of the beam which may be received through the aperture 45 are represented by the vertical lines 50 and 51. As the car, traveling upwardly, approaches the floor position at a substantial velocity the light cell holder 41 is rotated in a counterclockwise direction by means of a torque motor 52 energized by a tachometer generator 54 in accordance with the speed of the car so that the received beam will lie somewhere to the left of the center line 49 by a distance proportional to the velocity of the car. If the car speed continues at a substantial value, the received beam of light being at the left will be intercepted by the edge of the stationary screen 36 at a substantial distance from the floor position. Hence, the photo-electric cell will become dark and non-conducting.

If the car approaches the landing at a slower speed the received beam of light will not be so far to the left of the center line 49 and will not be intercepted by the screen 36 until the car approaches the floor more closely; this being due to the profile of the screen as shown in Fig. 4. If the car is moving at an almost imperceptible speed the received beam will be practically on the center line and will not be intercepted until the car practically arrives at the floor. Thus it will be seen that the leveling power will be cut off and the brake applied at different distances from the floor according to the car velocity.

In any specific installation the most suitable profile for the stationary screens 36 and 37 will, of course, be conditioned upon the characteristics of velocity versus the distance of the car while retarding, taken in combination with the characteristics of the car velocity versus transverse displacement of the movable cylindrical holders 41 and 42 of the photo-electric cells. It will be understood by persons skilled in the art that when the profile of the stationary screen is properly designed the cut-off of leveling power and the application of the brake will occur at such a time that the car will slide practically to the floor irrespective of differences in the velocity of approach.

It will, of course, be understood that although the screens 36 and 37 will have similar profiles they will be mounted oppositely in the shaft as shown in Fig. 4 so as to operate correspondingly for approaches of the car from opposite directions.

In order that the holders 41 and 42 of the photo-electric cells may be given transverse movement proportional to the speed of approach of the car, a pair of torque motors 52 and 53 are energized from a small tachometer generator 54 in accordance with the speed of the main driving motor 11 to the drive shaft of which the armature of the tachometer generator is connected through suitable reduction gearing 55. It is not necessary that a tachometer generator be used since it will be understood that the torque motors 52 and 53 might be driven by the C. E. M. F. of the traction motor 11. The torque motors 52 and 53 may be mounted in any suitable manner upon the elevator and as shown they are mounted respectively in rectangular boxes 56 and 57. Transverse motion of the photo-electric cell holders 41 and 42 is respectively imparted thereto from the torque motors 52 and 53 by means of link mechanisms 58 and 59 which are respectively connected to the armature members of the torque motors 52 and 53 through suitable connections not shown.

When the control units just described are secured at or near the top of the elevator as is shown in these drawings it will be clear that they are located a considerable distance above the floor of the elevator. Necessarily the screens 36 and 37 will be located in the hatchway a corresponding distance above the floor of the landing with which they are associated. For convenience in understanding the operation however, the screens may be considered as actually located at their respective floors in which cases the control device may also be considered as located at the elevator floor level. The screen 36 controls the movement of the elevator in a downward direction, whilst the screen 37 controls the movement of the elevator in an upward direction and the screens of each pair may be considered as mounted respectively above and below their landing floor although as shown in Figs. 2 and 4 they are actually situated above the floor. For control purposes therefor the landing floor may be considered as an imaginary one midway between the corresponding pair of screens. Thus the pair of screens 36 and 37 of Fig. 2 which are actually associated with the floor 60 may be considered as respectively above and below an imaginary floor 61 shown in dotted lines, which is the same distance above the floor 60 that the control devices are located above the floor of the elevator.

The arm of the manually operated controller 20 is provided with a lower electrical conducting segment 62 and two stationary contacts 63 and 64 are provided which are engaged by the extremities of the segments 62 and are thereby electrically interconnected when the controller is in the off position so as to establish a control circuit for the automatic control means. It is clear that the segment 62 cannot engage the remaining stationary contacts of the controller controlled by the upper switch segment because as shown the segment 62 occupies a position outside of the remaining contacts. The relays 27 and 28 are each provided with an upper and a lower set of contacts with which their bridging members cooperate. When the relays are in their uppermost positions which is normally the case and which corresponds to a condition of reception of light by the photo-electric cells 25 and 26 the two relays close the electric circuits respectively leading from the contacts 63 and 64 through the coils 18a and 17a respectively to a common supply main of the source 16. As shown, these circuits are normally open but may be completed through conductors 65 and 66 to the upper or positive supply main. When the relay 27 is energized sufficiently to raise its bridging contact to engage its upper pair of contacts, the contact 63 is thereby electrically connected to the second right hand upper contact 67 and similarly when the relay 28 is energized the contact 64 is electrically connected to the second left hand upper contact 68. It will thus be observed that in case both the relays 27 and 28 are either energized or deenergized that neither of the reversing contactors 17 nor 18 will be energized provided, of course, that the controller 20 is in the central or off position.

As is usual in elevator installations a suitable braking mechanism will be provided such, for example, as the solenoid connected brake 69 on the shaft of the traction motor 11 and an operating coil 70 which when energized releases the brake against the tension of the spring or other brake setting means (not shown) tending to hold the brake applied. The coil 70 is energized from the supply source 16 and is controlled by an electromagnetic switch 71 in its circuit.

Switch 71 is provided with upper and lower contacts and a movable bridging member adapted to cooperate therewith, the bridging member being raised to its upper position into engagement with the upper contacts whereby the circuit of the brake coil 70 is closed, by means of either of the coils 72 or 73. When the bridging member is released it drops to its lowermost position into engagement with its lower pair of contacts whereby the brake coil 70 is disconnected from the supply source and properly short circuited through a discharge resistor 74.

Coil 72 of switch 71 is included in a common circuit including the conductor 75 for connecting coils 17a and 18a of the switches 17 and 18 and consequently when one or the other of the switches 17 or 18 is closed, coil 72 is energized and the switch 71 held in its upper position to release the brake 69. The lowermost coil 73 is connected directly across the armature terminals 12 so as to be responsive to the voltage across the generator armature. Consequently coil 73 tends to assist coil 72 in maintaining the switch 71 closed when the generator is supplying current to the motor, that is, during elevator operation. But the coil 73 is also energized when the motor 11 is being overhauled by the elevator during deceleration and is acting as a generator to supply current to generator 12. Therefore, the generator braking coil 73 holds the brake released during deceleration after the coil 72 has been deenergized by movement of the controller to the off position.

In operation the elevator is started and accelerated by means of the controller 20 and as long as the controller is maintained in any running position the automatic control means is ineffective and the elevator will proceed past the various floors without stopping since it is only when the controller is in the off position and the contacts 63 and 64 thereby electrically interconnected that the relays 27 and 28 can control the operation of the elevator.

When it is desired to stop at a particular floor the operator will move the controller 20 to the off position at as nearly the proper point in the travel of the car as it is possible for him to judge to make a stop at that floor. The operator for example may use his own discretion in throwing the controller 20 to the off position or a suitable signal means (not shown) may be provided whereby the operator will be given a visual or audible signal at the proper instant admonishing him to throw the controller 20 to the off position. When the controller is thrown to the off position as shown in the drawings the generator field winding 15 is deenergized and the motor 11 is thereupon regeneratively braked to decelerate the elevator; power being returned to the alternating supply circuit by the driving motor 13 which then acts as a generator, it being driven by the supply generator 12 which is then acting as a motor. The decay of the generator field 15 is modified by the inductive effect of the short circuited winding 22 so as to give the desired braking effect and hence the desired deceleration of the elevator with due regard to the comfort of the passengers and the speed of operation.

The elevator will thus be regeneratively braked until it arrives sufficiently near the floor for one or the other of the screens 36 or 37 as the case may be, to take control; the speed of the car, assuming the controller 20 to have been thrown to the off position at the proper instant, having been reduced to some predetermined low speed at which the screens can take control. The speed at which the screens can take control is determined by means of auxiliary coils 76 and 77 respectively provided for the switches 17 and 18 and arranged when energized to apply force tending to hold the switches open. As shown these coils are connected in series across the terminals of the generator 12 and preferably are so designed that with the elevator speed above a predetermined value such for example as 25% of the full running speed they will be energized sufficiently by the generator voltage corresponding to this speed to prevent the reversing switches 17 and 18 from being closed either by the automatic control units or by the manual controller 20. It will be understood, however, that the coils 76 and 77 do not exert sufficient force to open switches 17 or 18 while either of them is held in closed position by the coils 17a or 18a as for example when the elevator is being operated at high speed by the controller 20.

The zone extending a short distance above and below each landing such as a few inches to a foot or more above or below the landing, in which the screens have control may be termed the "leveling zone". It will be understood that the controller 20 should be thrown to the off position at such distances from the desired landing that the elevator on arriving at the leveling zone will have been decelerated to the predetermined low speed at which the screens can take control or to some lower speed. Of course, if the controller is thrown to the off position too early so that the elevator is decelerated and stopped before the leveling zone is reached then it must be restarted by the manually operated controller 20; likewise the same procedure would be used if the controller 20 were thrown to the off position so late that the elevator would run through the leveling zone and finally be stopped at a point beyond.

When the elevator arrives at a leveling zone the opaque screens 36 and 37 control the reversing switches 17 and 18 so as to continue the operation of the traction motor 11 to drive the elevator car at slow speed or further decelerate it or reverse it as required. For example, the elevator may tend to come to rest before the floor is reached but within the leveling zone in which case the movement of the elevator is automatically continued, or the elevator may arrive at the leveling zone at a speed which is low enough for the screens to take control but still high enough to cause the elevator to overrun the floor. In the latter case the traction motor will be automatically reversed and the car returned to the floor.

It will now be assumed in explaining the leveling operation that the car is proceeding in a downward direction. As the car approaches the floor at which it is desired to stop the elevator, the screen 36 will come between the source of light 29 and the photoelectric cell 25 and will intercept the light rays from the source 29 thus rendering the photo-electric cell 25 dark and non-conducting as will be understood by persons skilled in the art. As a result of the photo-electric cell 25 being made non-conducting the negative bias on the grid of the electric discharge device 23 will be increased, the result of which will be to interrupt the flow of current in the plate circuit of this tube and to deenergize the leveling relay 27 thereby permitting the latter to fall to its lowermost position in which it bridges its lower pair of contacts. In its lower position the relay 27 closes a circuit for the down contactor 17; the circuit being traced from upper supply line 16 over conductor 65, through the contacts of relay 27 in its lower position, contact 63, segment 62, contact 64, contacts of relay 28 in its upper position to and through the coil 17a of down contactor 17, thence by way of conductor 75 to the negative supply line. The closing of down contactor 17 connects the field winding 15 to the supply source with the entire amount of the resistance 19 in series with the field winding; the electrical connections being established through the conductor 65 leading from one side of the supply source to one terminal of the resistance, thence through the resistance and the switch 17 to and through the winding 15 and from the opposite winding terminal back through the switch 17 and the conductor 75 to the opposite side of the supply source. The generator 12 is thus caused to supply a low voltage to the motor 11 which is of a proper magnitude to drive the elevator at a low leveling speed through the remaining short distance before the desired floor is reached.

The screen 36 extends below the floor landing for a distance sufficient to continue this low speed operation of the elevator below the landing were it not for the fact that the screen 37 extends above the floor landing a similar amount. Thus when the car arrives sufficiently close to the floor to permit the screen 37 to intercept the light from the source 29 to the photo-electric cell 26, the photo-electric cell 26 is rendered dark and the electric discharge device 24 rendered non-conducting in the manner already explained for discharge device 23. As a result of electric discharge device 24 being rendered non-conducting, leveling relay 28 is deenergized and its bridging member drops to the lower position thus opening its upper contacts and thereby opening the circuit of the coil 17a of the down contactor 17 and the coil of the braking contactor 72. Down contactor 17 falls to its lower position opening the circuit of the generator field winding 15. Thereupon due to the low voltage of the generator armature the coil 73 will no longer be energized sufficiently to retain the switch 71 in its uppermost position and the brake switch will drop and deenergize the brake coil 70. This permits the brake to be applied by its bias mechanism (not shown) and the elevator is thereupon gradually brought to rest level with the desired floor.

If the speed of the car is greater than the correct value at any time when the car is in the leveling zone during a downward leveling operation, the voltage generated by the tachometer generator 54 will be sufficient to cause the torque motor 53 to effect a transverse movement of the holder 42 for photo-electric cell 26, i. e., the holder 42 will be rotated in a clockwise direction about its pivot 44 until the light from the source 29 to the photo-electric cell 26 is intercepted by the portion of the screen 37 above the landing. The light to the photo-electric cell 26 being intercepted the cell will be rendered dark and non-conducting and as a result electric discharge device 24 will be rendered non-conducting thus deenergizing leveling relay 28 permitting it to drop to its lower position to interrupt the circuit for the coil 17a of the down contactor 17 and the coil 72 of the brake switch as explained before. Thus the leveling power will be cut off and the brake applied earlier than would be the case if the elevator were traveling at the proper speed in the leveling zone.

If the elevator is traveling upwardly the screen 37 takes control as the desired landing is approached as will be understood from the previous description in connection with the downward operation to intercept the light rays from source 29 to the photo-electric cell 26 whereby relay 28 will be permitted to drop to its lower position to complete the circuit for the coil 18a of up contactor 18. This circuit for the coil 18a may be traced from one side of the supply source through the conductor 66, lower contacts of relay 28, contact 64, segment 62, contact 63, contacts of relay 27 in its upper position to and through the coil 18a of upper contactor 18, coil of the brake relay 72 and thence by conductor 75 to the opposite side of the supply line. Assuming that the elevator tends to come to rest before the floor is reached it is brought slowly upward to the desired landing and at the appropriate point the screen 36 intercepts the light from source 29 to the photo-electric cell 25 thus rendering the electric discharge device 23 nonconducting, and permitting leveling relay 27 to drop to its lower position in which it interrupts the energizing circuits for the up contactor 18 to the brake switch 71 whereupon the elevator is brought to rest in the manner already explained by application of the solenoid brake.

If the elevator speed is above the low leveling speed when the screen 37 takes control or at any time when the car is within the leveling zone the tachometer generator 54 will energize torque motor 52 sufficiently to cause the holder 41 for photo-electric cell 25 to be rotated in a counterclockwise direction to a position to the left of the center line 49 of the screen 36 so that the light rays from the source 29 to the photo-electric cell 25 will be intercepted to render the photo-electric cell 25 dark and non-conducting and likewise the electric discharge device 23 non-conducting in the manner previously explained. The rendering of the electric discharge device 23 non-conducting will permit the leveling relay 27 to drop to its lower position to interrupt the energizing circuits of the up contact 18 to the brake relay 72 whereupon the elevator will be brought to rest by the application of the solenoid brake.

In the event the elevator speed is above the low leveling speed when the screens take control the deceleration of the elevator will obviously be aided by regenerative braking until leveling speed is reached. In case the elevator overruns a floor either in an upward or downward direction, it will be observed that the control will be taken over by the other screen at that floor and the elevator reversed and leveled from the opposite direction.

As previously pointed out the downward screens 36 terminate a short distance such as a fraction of an inch beneath their respective floors whereas the upward screens 37 terminate a similar short distance above their respective floors, thus leaving a very limited stopping zone between the terminations of the screens at each floor in which the light rays from the source 29 to both photo-electric cells 25 and 26 will be intercepted and the elevator automatically stopped in a manner that has been completely described.

It should be noted furthermore that provision is made for stopping the elevator even though the leveling relay 27 or 28, as the case may be, fails to drop out after the elevator moves from the influence of a screen. This is effected by the opposite screen either downward or upward as the case may be at the floor. For example, if the relay 28 should fail to drop out for a downward stop after the elevator has moved beyond the influence of the screen 36 then as the elevator continues downward the photo-electric cell 25 will again receive light from the source 29 and will be rendered conducting which in turn will render the electric discharge device 23 conducting, causing the relay 27 to be picked up to open the circuit of the coil 17a of the down contactor 17 which was previously closed by the relay 28. In a similar manner when the elevator is moving upwardly if the relay 27 fails to drop out, the control will be opened by the relay 28 upon the overrunning of the elevator.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:

1. An elevator system comprising a motor for driving the car, means comprising a pair of light sensitive devices for jointly controlling the operation of said motor in both directions, means for rendering one of said devices operative to provide continued operation of said motor in the same direction as the car approaches a desired stopping point, and means for rendering the other of said devices operative to stop said motor so as to bring said car to rest substantially level with said stopping point.

2. An elevator system comprising a motor for driving the car, means comprising a pair of light sensitive devices for jointly controlling the operation of said motor in both directions of rotation, means comprising a screen for rendering one of said devices operable to provide continued operation of the motor in the same direction as the car approaches a desired stopping point, and means comprising a second screen for rendering the other of said devices operable to stop said motor so as to bring the car to rest substantially level with said desired stopping point.

3. An elevator system comprising a motor for driving the car, a switching device for controlling the energization of said motor, a pair of control relays for jointly controlling the operation of said switching device, means comprising a light sensitive device for causing one of said relays to operate said switching deivce to provide continued energization of said motor as the car approaches a desired stopping point, and means comprising a second light sensitive device for causing the other of said relays to operate said switching device to deenergize said motor so as to bring said car to rest substantially level with said stopping point.

4. An elevator system comprising a motor for driving the car, a pair of switches for controlling the direction of rotation of the motor, a pair of control relays each having normally open and normally closed contacts, a control circuit for one of said switches including the normally open contacts of one of said relays and the normally closed contacts of the second of said relays, means comprising a light sensitive device for causing one of said relays to close its normally open contacts when the car approaches a desired landing so as to complete said circuit and close said switch for continued operation of the car in the same direction at low speed, and means comprising a second light sensitive device for causing the other of said relays to open its normally closed contacts to open said switch so as to bring said car to rest substantially level with said landing.

5. An elevator system comprising a motor for driving the car, means comprising a pair of light sensitive devices for jointly controlling the operation of said motor, means comprising a screen for rendering one of said devices operable to provide for continued rotation of said motor when the car approaches a desired stopping point from one direction and for rendering said device operable to stop said motor when the car approaches said stopping point from the opposite direction, and means comprising a second screen for rendering the other of said devices operable to provide for continued operation of the motor when the car approaches said stopping point from said opposite direction, and operable to stop said motor when the car approaches said stopping point from said first mentioned direction.

6. An elevator system comprising a motor for driving the car, means for stopping said motor, means comprising a screen and a cooperating light sensitive device controlled thereby for controlling said stopping means to stop said motor, and means responsive to the speed of said motor for determining the distance of said car from a desired stopping point at which the cooperation of said screen and said device is initiated so as to bring said car to rest substantially level with said desired stopping point.

7. A control system for elevators and the like comprising driving means for the elevator, switches for controlling said driving means for forward and reverse operation, coils for controlling said switches, electromagnetic relays for jointly controlling said coils, said relays being normally in predetermined positions in which said coils are deenergized, connections whereby separate operation of said relays closes circuits for said coils respectively, said circuits when closed by one relay including also the contacts of the other relay in its normal position, means for controlling said relays including a plurality of light sensitive devices, and means in the hatchway cooperating with said light sensitive devices for selective control thereof to effect selective operation of said relays to control the elevator.

8. An elevator system comprising an electric motor for driving a car in a hatchway provided with landings, a light sensitive device automatically actuated as the car approaches the landing to control the motor so as to bring the car to rest at the landing and means dependent upon the speed at which the car approaches the landing for varying the point in the travel of the car at which the control is effected.

9. In a control system for an object movable in a constrained path, means including a light sensitive device automatically controllable by movement of the object for varying an operating condition of the device to control movement of the object, and means automatically controllable in acordance with the speed of movement of the body for modifying the action of said first mentioned means.

10. A control system for an object movable with respect to a second object comprising means including a movably mounted light sensitive device automatically controllable in accordance with the relative positions of said objects to vary an operating condition of said device for controlling the movement of the object, and means responsive to the speed of relative movement of said objects for effecting relative movement between said device and one of said objects to control an operating condition of said device for modifying the action of said first mentioned means.

11. In a control system for an object movable along a predetermined path, means including a source of light, a cooperating light sensitive device and a screen relatively movable between said source and said device for controlling an operating condition of said means to control movement of said object, and means responsive to the speed of relative movement between said screen and said device to effect an additional relative movement therebetween for modifying the action of said first mentioned means.

12. An elevator control system comprising driving means for the car, means for deenergizing said driving means prior to arrival of the car at a floor, means including a light sensitive device and a cooperating source of light for maintaining said driving means energized at low speed, a screen mounted to intercept the light from said source to vary an operating condition of said device to deenergize said driving means when the car is level with the floor, and means responsive to the speed of said driving means for effecting relative movement between said source and said device for causing the light to said device to be intercepted to deenergize said driving means at distances from the floor proportional to the speed of the car when the speed is greater than a predetermined value.

13. An elevator control system comprising in combination, means for driving the car, means for initiating deceleration of the driving means prior to arrival at a desired landing, control means including a source of light and a cooperating relatively movable light sensitive device for maintaining said driving means energized at low speed after operation of said decelerating means, means responsive to the speed of said driving means for effecting relative movement between said device and said source proportional to the speed of driving means, and a screen configured to intercept the light from said source to said device when the relative movement therebetween is greater than a predetermined value to vary an operating condition of said control means to deenergize said driving means at distances from the floor proportional to the speed of the car.

In witness whereof, I have hereunto set my hand this 24th day of September, 1929.

MAX A. WHITING.